US011263200B2

(12) United States Patent
Zhuo

(10) Patent No.: US 11,263,200 B2
(45) Date of Patent: Mar. 1, 2022

(54) METHODS AND DEVICES FOR DATA TRAVERSAL

(71) Applicant: Advanced New Technologies Co. Ltd., Grand Cayman (KY)

(72) Inventor: Haizhen Zhuo, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/775,791

(22) Filed: Jan. 29, 2020

(65) Prior Publication Data

US 2020/0364207 A1   Nov. 19, 2020

Related U.S. Application Data

(63) Continuation of application No. PCT/CN2019/086879, filed on May 14, 2019.

(51) Int. Cl.
*G06F 16/00* (2019.01)
*G06F 16/23* (2019.01)
(Continued)

(52) U.S. Cl.
CPC ...... *G06F 16/2365* (2019.01); *G06F 16/2255* (2019.01); *G06F 16/2272* (2019.01); *G06F 16/28* (2019.01)

(58) Field of Classification Search
CPC .. G06F 16/27; G06F 16/1805; G06F 16/1834; G06F 16/2255; G06F 21/645; G06F 16/2379; G06F 21/12; G06F 21/51; G06F 21/57; G06F 21/602; G06F 21/64; G06F 8/60; G06F 8/71; G06F 8/73; G06F 11/00; G06F 11/0757; G06F 11/1451; G06F 11/1464; G06F 11/2094; G06F 11/3409;
(Continued)

(56) References Cited

U.S. PATENT DOCUMENTS

2019/0042620 A1   2/2019 Garagiola et al.
2019/0156332 A1*  5/2019 Christidis ................. H04L 9/14
(Continued)

FOREIGN PATENT DOCUMENTS

CN   109063016 A   12/2018
CN   109614806 A   4/2019
WO   WO 2019/072266 A2   4/2019

OTHER PUBLICATIONS

Written Opinion of the International Searching Authority of PCT Application No. PCT/CN2019/086879, dated Feb. 14, 2020, issued by the ISA/CN—National Intellectual Property Administration, PRC, China.

(Continued)

*Primary Examiner* — Shyue Jiunn Hwa
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for data traversal. One of the methods includes: obtaining one or more key-value pairs from a program for use on a blockchain; indexing one or more keys of the one or more key-value pairs to generate an index, the index associating the one or more keys with an identifier of the program; and retrieving at least one value in the one or more key-value pairs based on the index.

15 Claims, 5 Drawing Sheets

(51) Int. Cl.
*G06F 16/22* (2019.01)
*G06F 16/28* (2019.01)

(58) Field of Classification Search
CPC ............. G06F 11/3604; G06F 11/3608; G06F 11/3612; G06F 11/3684; G06F 11/3692; G06F 16/13; G06F 16/134; G06F 16/2246; G06F 16/2282; G06F 16/2365; G06F 21/105; G06F 21/46; G06F 21/56; G06F 21/572; G06F 21/577; G06F 2201/80; G06F 7/58; G06F 7/582; G06F 8/70; G06F 9/445; G06F 9/451; G06F 16/182; G06F 21/32; G06F 21/45; G06F 21/31; G06F 16/285; G06F 16/9014; G06F 16/9027; G06F 21/16; G06F 21/316; G06F 21/33; G06F 21/6218; G06F 2209/5015; G06F 2209/503; G06F 2221/2101; G06F 30/20; G06F 3/011; G06F 40/186; G06F 9/5038; G06F 9/5044; G06F 9/505; G06F 16/9535; G06F 3/0484; G06F 16/245; G06F 16/24578; G06F 16/3322; G06F 16/338; G06F 16/9017; G06F 16/90324; G06F 16/951; G06F 16/9558; G06F 16/958; G06F 21/00; G06F 21/604; G06F 21/606; G06F 21/6209; G06F 21/6227; G06F 21/6245

See application file for complete search history.

(56) References Cited

U.S. PATENT DOCUMENTS

| 2019/0268140 A1* | 8/2019 | Kandiraju | H04L 9/3268 |
| 2019/0303541 A1* | 10/2019 | Reddy | H04L 9/0643 |
| 2020/0034457 A1* | 1/2020 | Brody | H04L 9/0819 |
| 2020/0073758 A1* | 3/2020 | Natarajan | H04L 9/3239 |
| 2020/0082391 A1* | 3/2020 | Androulaki | H04L 9/3247 |
| 2020/0211054 A1* | 7/2020 | Garg | G06Q 20/401 |
| 2020/0320225 A1* | 10/2020 | Irvine | H04L 9/30 |

OTHER PUBLICATIONS

International Search Report of PCT Application No. PCT/CN2019/086879, dated Feb. 14, 2020, issued by the ISA/CN—National Intellectual Property Administration, PRC, China.

Extended European Search Report in European Application No. 19741279.4, dated Dec. 3, 2020.

* cited by examiner

METHODS AND DEVICES FOR DATA TRAVERSAL

CROSS REFERENCE TO RELATED APPLICATIONS

This application is a continuation of International Application No. PCT/CN2019/086879, filed May 14, 2019, the entire content of which is incorporated herein by reference.

TECHNICAL FIELD

The specification relates generally to computer technologies, and more particularly, to methods and devices for data traversal.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system is implemented using a peer-to-peer (P2P) network, in which the nodes communicate directly with each other, e.g., without the need of a fixed, central server. Each node in the P2P network may initiate communication with another node in the P2P network.

A blockchain system maintains one or more blockchains. A blockchain is a data structure for storing data, such as transactions, that may prevent tampering and manipulation of the data by malicious parties. The blockchain system may support execution of one or more smart contracts. Each smart contract may be a computer protocol in the form of computer code that is incorporated into a blockchain, to facilitate, verify, or enforce the negotiation or performance of a contract.

Smart contracts may specify data using key-value pairs. Each key-value pair may include a key and a value that can be retrieved using the key. When a smart contract is incorporated into a blockchain, the key-value pairs specified in that smart contract may be recorded on the blockchain. For security reasons, the blockchain system may record the key-value pairs using modified keys that are different from the original keys specified in the smart contract. For example, instead of recording key-value pairs <key1, value1> and <key2, value2>, where key1 and key2 are the original keys, the blockchain system may record modified key-value pairs, <hash(key1), value 1> and <hash(key2), value2>, on the blockchain, where hash(key1) and hash(key2) represent hash values of key1 and key2 computed according to a predefined hash function. Because hash(key1) and hash(key2) are unrelated to each other, it may require at least two separate input/output (I/O) operations to retrive the recorded key-value pairs <hash(key1), value1> and <hash(key2), value2>.

Furthermore, current implementations of blockchain systems typically record key-value pairs in a tree data structure. A tree data structure may include, e.g., a Trie Tree, a Merkle Tree, a Merkle Patricia Tree, a bucket tree, or the like. Recording the key-value pairs, e.g., <hash(key1), value1> and <hash(key2), value2>, in a tree data structure may further increase the number of I/O operations needed to traverse the recorded key-value pairs. For example, if a smart contract contains n key-value pairs, and if a blockchain system utilizes a Merkle Patricia Tree with a depth equal to d to record these key-value pairs, it may require up to (d−1)×n I/O operations to traverse n recorded key-value pairs.

Therefore, there is a need for a method to improve the ability to traverse through key-value pairs specified in smart contracts.

SUMMARY

In one aspect, a computer-implemented method for data traversal includes: obtaining one or more key-value pairs from a program for use on a blockchain; indexing one or more keys of the one or more key-value pairs to generate an index, the index associating the one or more keys with an identifier of the program; and retrieving at least one value in the one or more key-value pairs based on the index.

In another aspect, a device for data traversal includes: one or more processors; and one or more computer-readable memories coupled to the one or more processors and having instructions stored thereon that are executable by the one or more processors to obtain one or more key-value pairs from a program for use on a blockchain; index one or more keys of the one or more key-value pairs to generate an index, the index associating the one or more keys with an identifier of the program; and retrieve at least one value in the one or more key-value pairs based on the index.

In still another aspect, a non-transitory computer-readable medium have stored therein instructions that, when executed by a processor of a device, cause the device to perform a method for data traversal. The method includes: obtaining one or more key-value pairs from a program for use on a blockchain; indexing one or more keys of the one or more key-value pairs to generate an index, the index associating the one or more keys with an identifier of the program; and retrieving at least one value in the one or more key-value pairs based on the index.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
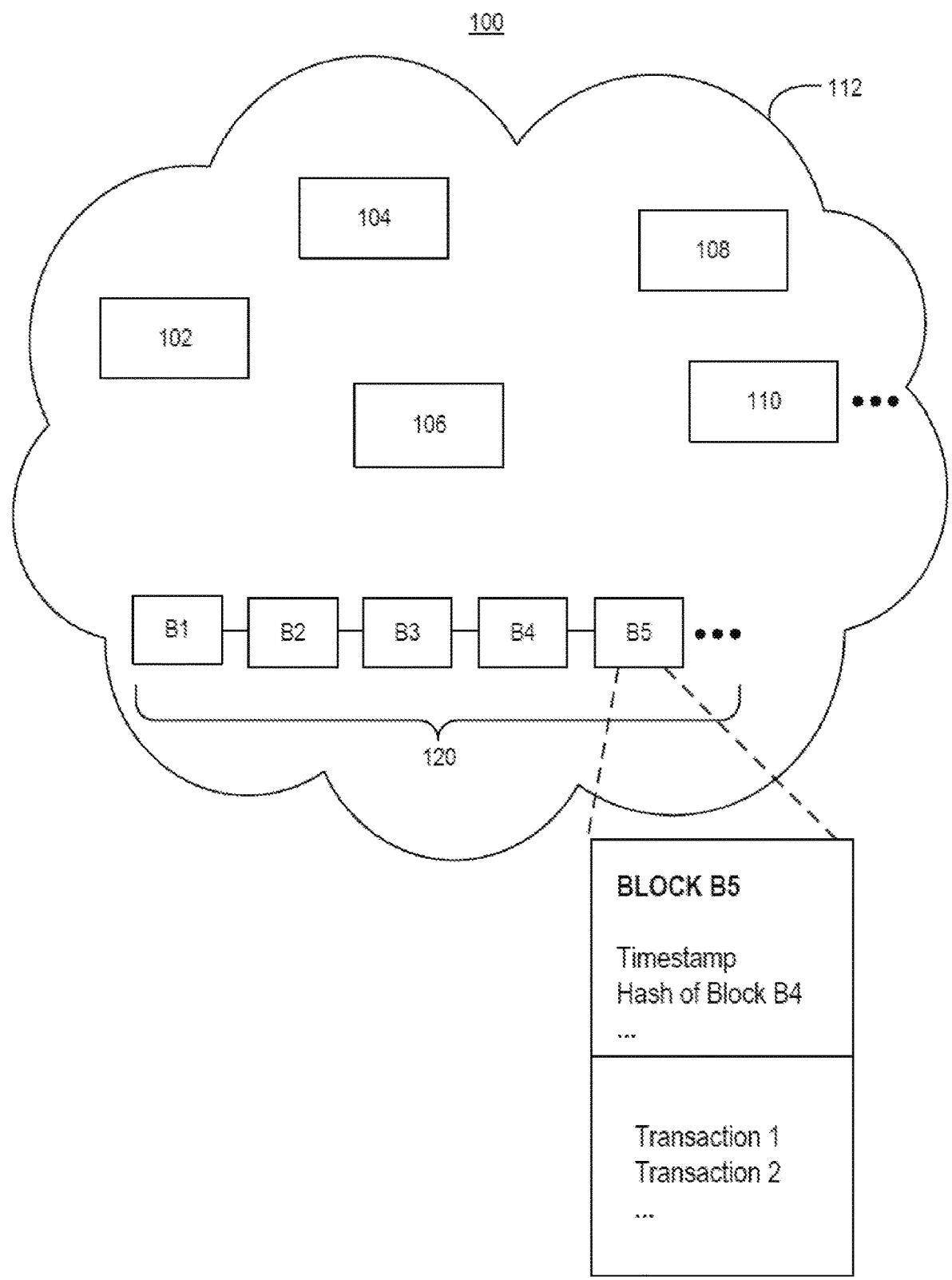
FIG. 1 is a schematic diagram of a blockchain system, according to an embodiment.

Embodiments of the specification provide methods and devices for data traversal. The methods and devices utilize an index to keep track of key-value pairs obtained from smart contracts. The methods and devices also utilize the index to provide a data traversal solution, which may be utilized to facilitate traversal of the key-value pairs in the smart contracts. The methods and devices further provide an interface, e.g., an application programing interface (API), that allows users of blockchain systems to utilize the data traversal method provided. The users may, for example, program smart contracts to utilize the data traversal method through the API.

Embodiments disclosed in the specification have one or more technical effects. In some embodiments, the methods and devices index key-value pairs in smart contracts. This provides a data traversal solution that can be utilized to facilitate traversal of key-value pairs in the smart contracts. In some embodiments, the methods and devices provide an interface, e.g., an API, to support utilization of the data traversal solution. This reduces a number of I/O operations needed to traverse key-value pairs in smart contracts. In some embodiments, the methods and devices support local maintenance of index records. This allows the nodes in a blockchain system to maintain their index records locally, which can be used to support traversal operations both on the blockchain and off the blockchain. In some embodiments, the methods and devices utilize a consensus protocol implemented in the blockchain system to ensure that the index records maintained by the nodes are up-to-date. This provides a simple and computationally inexpensive solution to manage the index records maintained by the nodes. This also allows the nodes to maintain their index records without affecting other operations on the blockchain.

A blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a sub-set of entities (nodes) (e.g., at least 7 entities) must sign every block in order for the block to be validated and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
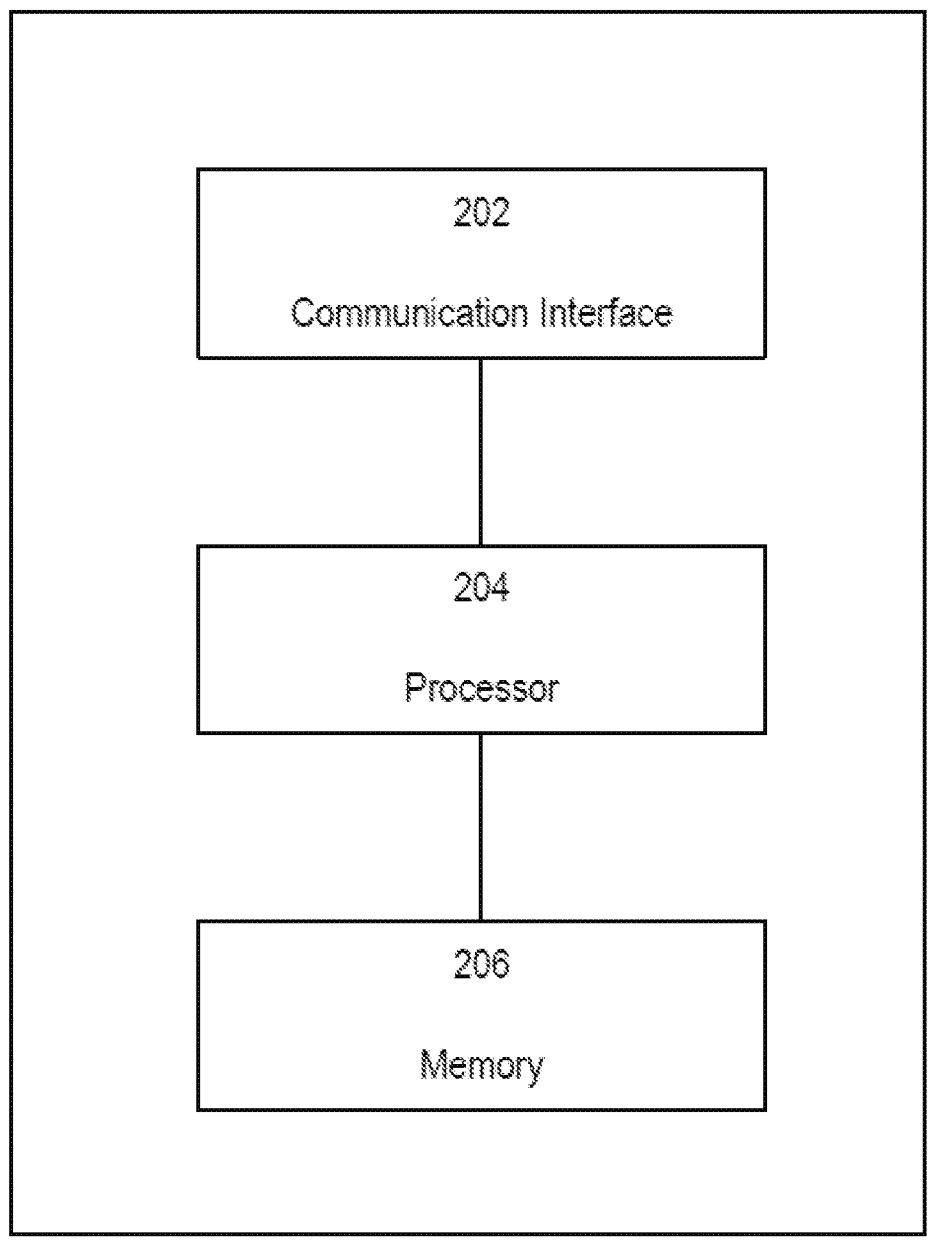
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Referring back to FIG. 1, the blockchain system 100 may support execution of one or more smart contracts. Each smart contract may be a computer protocol in the form of computercode that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart contract may include a plurality of subroutines or functions, each of which may be a sequence of program instructions that performs a specific task. The smart contract may be operational code that is fully or partially executed without human interaction.

The smart contract may contain one or more data records. Such data records may be specified as key-value pairs in the smart contract. For example, the smart contract may contain a group of key-value pairs <key1, value1>, <key2, value2>, . . . <keyN, valueN>. This group of key-value pairs may be referred to as a "map." The keys and values specified in the map may be of any data type, including, e.g., strings, integers, floating point numbers, Boolean values, and the like.

The smart contract may also contain more than one group of key-value pairs, i.e., more than one maps. For instance, the smart contract may include a first map Map_1 having account numbers as keys and remaining balances as values, as shown in Table 1 below:

TABLE 1

First Map (Map_1)

| Key | Value |
| --- | --- |
| Account_Number_1 | 1111.00 |
| Account_Number_2 | 2222.00 |
| Account_Number_3 | 3333.00 |

Also for example, the smart contract may also include a second map Map_2 having account numbers as keys and available credits as values, as shown in Table 2 below:

TABLE 2

Second Map (Map_2)

| Key | Value |
| --- | --- |
| Account_Number_1 | 50000.00 |
| Account_Number_2 | 60000.00 |
| Account_Number_3 | 70000.00 |
| Account_Number_4 | 80000.00 |

It is to be understood that the maps depicted above are merely provided as examples and are not meant to be limiting. The smart contract may contain additional maps. The additional maps may be of various sizes and they may or may not use the same account numbers as keys.

When the smart contract is incorporated into the blockchain 120, the key-value pairs specified in the maps contained in the smart contract may be recorded on the blockchain 120. Recording the key-value pairs in this manner may allow users of the blockchain system 100 to retrieve the values specified in the smart contract using the keys. For example, a user of the blockchain system 100 may retrieve the balance information associated with a particular account by looking up the value associated with the key representing that particular account.

In some embodiments, recording the key-value pairs in this manner may limit the abilities to traverse through the key-value pairs specified in the smart contract, because doing so may require prior knowledge of the keys specified in the key-value pairs. The abilities to traverse may also be limited if the blockchain system 100 modifies the key-value pairs for recordation on the blockchain 120. For example, instead of recording key-value pairs <Account_Number_1, 1111.00>, <Account_Number_2, 2222.00>, and <Account_Number_3, 3333.00> as specified in the first map Map_1, the blockchain system 100 may modify the keys and record the modified key-value pairs <hash(Account_Number_1), 1111.00>, <hash(Account_Number_2), 2222.00>, and <hash(Account_Number_3333.00> on the blockchain 120.

The abilities to traverse may be further limited if the blockchain system 100 utilizes a tree data structure to record the modified key-value pairs.

Figure 3:
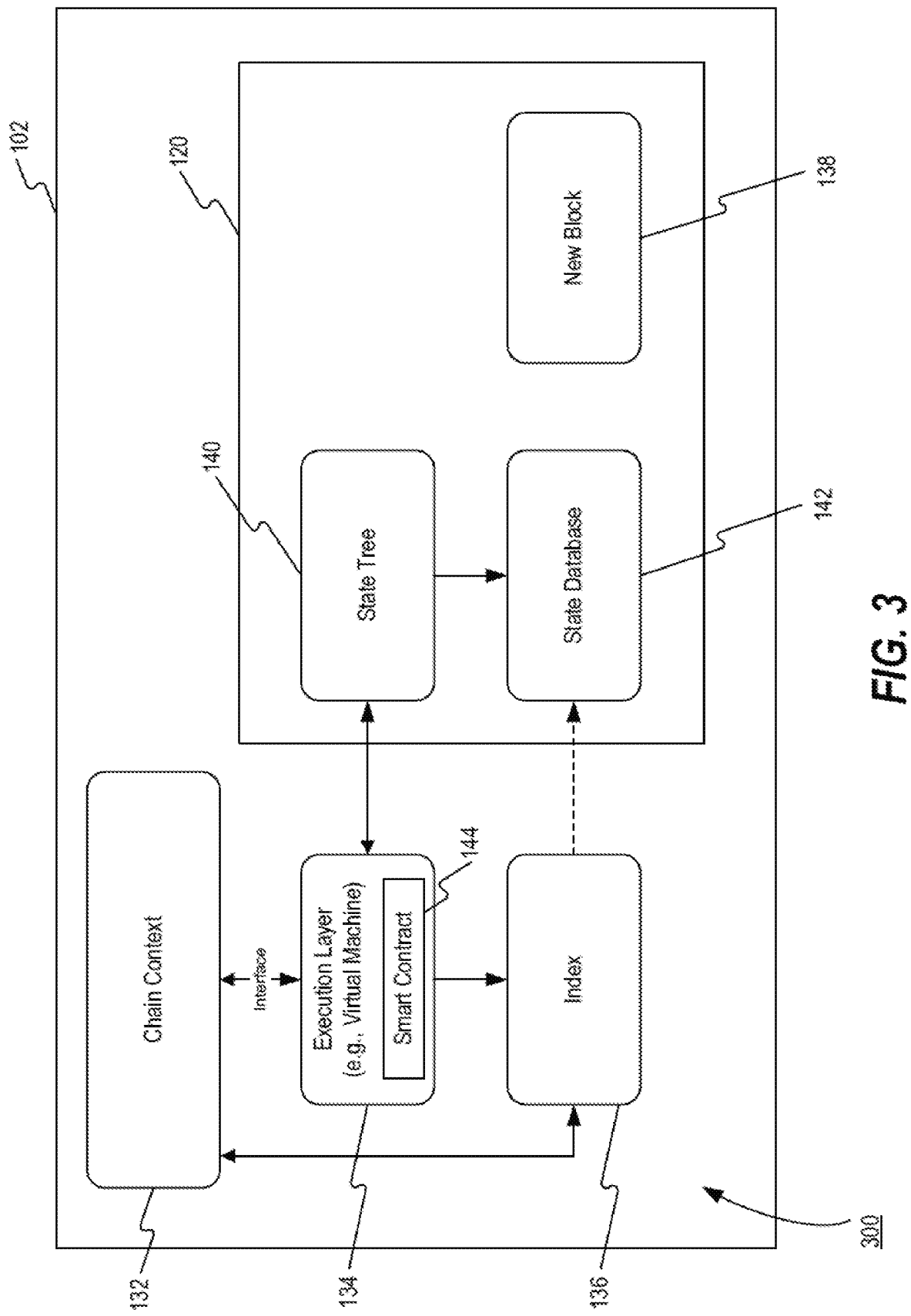
FIG. 3 is a schematic diagram of a data traversal solution, according to an embodiment.

A data traversal solution may be utilized to facilitate traversal of data, such as key-value pairs, specified in smart contracts. FIG. 3 is a schematic diagram of a data traversal solution 300 for a blockchain system, e.g., the blockchain system 100 (FIG. 1), according to an embodiment. Referring to FIG. 3, the data traversal solution 300 may be implemented in one or more nodes, e.g., the nodes 102-110, of the blockchain system 100 (FIG. 1).

In some embodiments, each node, e.g., the node 102, may utilize a memory, e.g., the memory 206 (FIG. 2), to store data. The data stored in the memory may include a chain context 132 and an index 136, both of which will be described in detail below. The data stored in the memory may also include a copy of the blockchain 120. In some embodiments, the copy of the blockchain 120 stored in the node 102 may include, for example, the blocks forming the blockchain 120, a state tree 140 containing keys included in transactions that have been incorporated into the blockchain 120, and a state database 142 containing values corresponding to the keys included in the state tree 140. The state tree 140 and the state database 142 may also record additional information that supports operations of the blockchain 120.

In some embodiments, each node, e.g., the node 102, may also utilize a processor, e.g., the processor 204 (FIG. 2), to support implementation of an execution layer 134 capable of executing smart contracts and carrying out the instructions for implementing the data traversal solution 300. In some embodiments, the execution layer 134 may be implemented as a virtual machine serving as a runtime environment for smart contracts. Such a virtual machine may be implemented in manners similar to Ethereum virtual machines and the like.

In some embodiments, the node 102 may implement the data traversal solution 300 by indexing data specified in smart contracts in the index 136. For example, when the node 102 decides to incorporate a smart contract 144 into a new block 138 of the blockchain 120, the node 102 may parse the smart contract 144 to obtain key-value pairs specified in the smart contract 144. The node 102 may index original keys specified in the obtained key-value pairs so that the index 136 can be utilized to facilitate traversal of these key-value pairs. The node 102 may also perform other operations on the blockchain 120. For example, the node 102 may record the keys specified in the smart contract 144 in the state tree 140. Also for example, the node 102 may record the values corresponding to the keys in the state database 142.

In some embodiments, the node 102 may record information in the index 136 to indicate associations between a smart contract and the key-value pairs specified in that smart contract. Referring to the smart contract in the example above, the node 102 may utilize the index 136 to record associations between the smart contract, the first and second maps Map_1 and Map_2, and the original keys specified in each of the first and second maps Map_1 and Map_2. The index 136 may include records representing <Smart_Contract_Identifier, <Map_Identifier, List_of_Original_Keys>>, where Smart_Contract_Identifier may be an identifier for uniquely identifying the smart contract amongst all smart contracts incorporated into the blockchain system 100, Map_Identifier may be an identifier for uniquely identifying a particular map, e.g., the first map or the second map, within the identified smart contract, and List_of_Original_Keys may include a list of all original keys specified in the identified map.

In some embodiments, the Smart_Contract_Identifier may include an address assigned to the smart contract by the blockchain system 100 when the smart contract is incorporated into the blockchain system 100. In some embodiments, the Map_Identifier may be generated by node 102. In some embodiments, the node 102 may parse through the smart contract and generate sequential identifiers for the maps specified in the smart contract. Continuing with the smart contract example above, the index 136 may include, for example:

<Smart_Contract_Address, <Map_1, {Account_Number_1, Account_Number_2, Account_Number_3}>>, and <Smart_Contract_Address, <Map_2, {Account_Number_1, Account_Number_2, Account_Number_3, Account_Number_4}>>.

It is to be understood that the representation depicted above, e.g., <Smart_Contract_Identifier, <Map_Identifier, List_of_Original_Keys>>, is a logical representation provided for illustrative purposes and is not meant to be limiting. It is contemplated that the index 136 may record the underlying data representing the logical representation in various manners, as long as the underlying data can indicate the associations between the smart contract, the maps specified in that smart contract, and the original keys specified in each of the maps specified in that smart contract. For example, in some embodiments, the index 136 may record the underlying data representing the logical representation in a multi-dimensional array. In some embodiments, the index 136 may record the underlying data representing the logical representation in one or more database tables. In some embodiments, the index 136 may record the underlying data representing the logical representation by concatenating the Smart Contract Identifier, the Map_Identifier, and the List_of_Original_Keys together. It is to be understood that the index 136 may record the underlying data representing the logical representation in other manners as well.

In some embodiments, the node 102 may record the index 136 locally without incorporating the content stored in the index 136 into the blockchain 120. Recording the index 136 locally may minimize the changes needed to implement the data traversal solution 300. In some embodiments, the node 102 may implement the data traversal solution 300 without changing the operations of the blockchain 120. The node 102 may, for example, provide an application programing interface (API) through the chain context 132, which may allow the smart contract 144 executing in the execution layer 134 to traverse through key-value pairs specified in the smart contract 144 (or key-value pairs specified in other smart contracts) by calling a traversal function provided through the API.

In some embodiments, the node 102 may utilize the chain context 132 to store execution context support the execution of the smart contract 144. The chain context 132 may include variables and commonly used functions provided by the blockchain system 100. For example, the chain context 132 may include a block( ) function, which may be called to provide a current block number. The chain context 132 may also include a msg.sender( ) function, which may be called to identify a sender of a message. The chain context 132 may also include other functions, including, but not limited to, those provided in blockchain systems such as Ethereum and the like.

The node 102 may implement the chain context 132 to further include data traversal functions. For example, in some embodiments, the chain context 132 may provide a traverse(Smart_Contract_Identifier) function. The traverse (Smart_Contract_Identifier) function may be executed based on a traversal request including information corresponding to the Smart_Contract_Identifier, and may allow a caller, e.g., the smart contract 144 executing in the execution layer 134, to specify a Smart_Contract_Identifier as input. The chain context 132 may carry out the traverse(Smart_Contract_Identifier) function and retrieve, from the index 136, a list containing, e.g., all original keys specified in a smart contract identified by the Smart_Contract_Identifier. The chain context 132 may then utilize the list of original keys to retrieve their corresponding values and return the values to the smart contract 144 to complete the traversal operation. Alternatively and/or additionally, the chain context 132 may return the list of original keys to the smart contract 144 and let the smart contract 144 define how it wants to process the keys.

In some embodiments, the chain context 132 may also provide a traverse (Smart_Contract_Identifier, Map_Identifier) function. The (Smart_Contract_Identifier, Map_Identifier) function may be executed based on a traversal request including information corresponding to the Smart_Contract_Identifier and the Map_Identifier, and may allow a caller, e.g., the smart contract 144 executing in the execution layer 134, to specify a Smart_Contract_Identifier and a Map_Identifier as input. The chain context 132 may carry out the traverse(Smart_Contract_Identifier, Map_Identifier) function and retrieve, from the index 136, a list containing all original keys specified in a map identified by the Map_Identifier contained in a smart contract identified by the Smart_Contract_Identifier. The chain context 132 may then utilize the list of original keys to retrieve their corresponding values and return the values to the smart contract 144 to complete the traversal operation. Alternatively and/or additionally, the chain context 132 may return the list of original keys to the smart contract 144 and let the smart contract 144 define how it wants to process the keys.

It is to be understood that the traverse( ) functions described above may be implemented using various types of programming languages and that the above declarations of such functions are merely provided as examples and are not meant to be limiting. The traverse( ) functions may be declared differently, e.g., with different function names or different listings of parameters, while still able to perform the same operations described above.

In some embodiments, the node 102 may incorporate certain types of characteristics regarding the index 136, without content of the index 136, into the blockchain 120. The characteristics that may be incorporated into the blockchain 120 may include, for example, a total number of keys recorded in the index 136. For example, in some embodiments, the node 102 may determine the total number of keys recorded in the index 136 and record the number in the state database 142. The total number recorded in this manner may be subject to a consensus protocol provided by the blockchain system 100, which may be utilized by the node 102 as well as other nodes 104-110 in the blockchain system 100 to determine whether they are in an agreement regarding what the total number should be. If a node, e.g., the node 104, has a different number of keys recorded in its local index, the node 104 may determine that its local index needs to be updated. In this manner, by incorporating some characteristics regarding the index 136 into the blockchain 120, the blockchain system 100 can ensure that the nodes 102-110 in the blockchain system 100 have a mechanism to check the status of their local indices.

Other types of characteristics regarding the index 136 may also be incorporated into the blockchain 120. For example, in some embodiments, the node 102 may store the index 136 as a Merkle Tree. The node 102 may compute a hash value of the Merkle Tree and record the resulting hash value in the state database 142. The hash value recorded in this manner may then be subject to the consensus protocol provided by the blockchain system 100, which may be utilized to by the node 102 as well as other nodes 104-110 in the blockchain system 100 to determine whether the index they each maintain locally is still up-to-date. If a node, e.g., the node 104, has a different hash value for the content stored its local index, the node 104 may determine that its local index needs to be updated.

Figure 4:
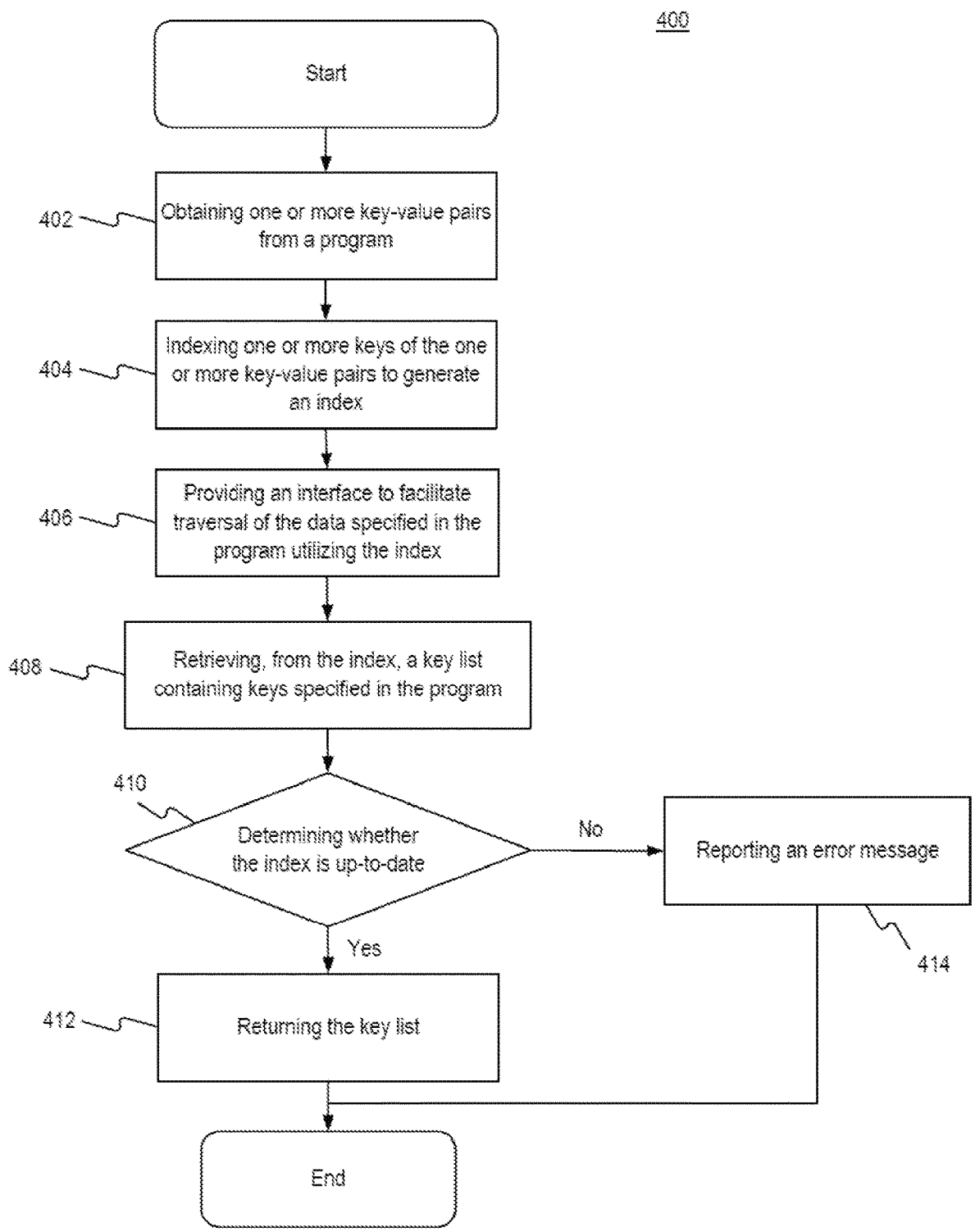
FIG. 4 is a flow chart of a method for data traversal, according an embodiment.

FIG. 4 illustrates a flow chart of a method 400 for data traversal, according to an embodiment. The method 400 may be performed by one or more nodes, e.g., the nodes 102-110, of the blockchain system 100 (FIG. 1). In some embodiments, the nodes 102-110 may invoke the method 400 every time the nodes 102-110 incorporate a smart contract into a blockchain, e.g., the blockchain 120 (FIG. 3).

At step 402, a node, e.g., the node 102, may load a program, e.g., the smart contract 144 (FIG. 3), into a runtime environment, e.g., the execution layer 134 (FIG. 3). The execution layer 134 may parse the smart contract 144 to obtain data specified in the smart contract 144. In some embodiments, the data specified in the smart contract 144 may include one or more key-value pairs and the execution layer 134 may obtain the one or more key-value pairs from the smart contract 144.

At step 404, the execution layer 134 may record the data specified in the smart contract 144 on the blockchain 120 and update an index, e.g., the index 136 (FIG. 3), based on the data specified in the smart contract 144. In some embodiments, the execution layer 134 may index the keys of the key-value pairs obtained from the smart contract 144 to generate the index 136. The execution layer 134 may utilize the index 136 to record information containing associations between the smart contract 144 and the key-value pairs specified in the smart contract 144. The index 136 may include records logically representing, e.g., <Smart_Contract_Identifier, <Map_Identifier, List_of_Original_Keys>>, as described above.

At step 406, the node 102 may provide an interface for the execution layer 134 to send a traversal request, e.g., by invoking a traversal function, to traverse the data specified in the smart contract 144. In some embodiments, the execution layer 134 may invoke the traversal function through an API provided by the node 102. In some embodiments, the node 102 may provide the API through an execution context, e.g., the chain context 132 (FIG. 3). In some embodiments, the chain context 132 may include execution context to support the execution of the smart contract 144. The chain context 132 may include, for example, variables and functions that may be used to provide information about e blockchain system 100. The chain context 132 may also include traverse functions such as the above described traverse(Smart_Contract_Identifier) or traverse(Smart_Contract_Identifier, Map_Identifier). The execution layer 134 may invoke one or more of these traverse functions provided by the chain context 132 through the API.

At step 408, the chain context 132 may carry out the traverse function and obtain, from the index 136, a list of original keys specified in the identified smart contract. The index 136 may include records logically representing <Smart_Contract_Identifier, <Map_Identifier, List_of_Original_Keys>> as described above. In some embodiments, the chain context 132 may also utilize the obtained keys to retrieve their corresponding values.

At step 410, the chain context 132 may determine whether the node 102 is in an agreement with other nodes 104-110 in the blockchain system 100 with respect to one or more characteristics of the index 136. In some embodiments, the chain context 132 may make the determination based on a total number of keys recorded in the index 136. Alternatively and/or additionally, the chain context 132 may make the determination based on a hash value of the index 136. It is contemplated that other characteristics of the index 136 may also be utilized to may make the determination.

If the chain context 132 determines that the node 102 is in an agreement with other nodes 104-110 in the blockchain system 100 with respect to the one or more characteristics of the index 136, the chain context 132 may, at step 412, return the keys along with their corresponding values to the execution layer 134 to complete the traversal operation. On the other hand, if the chain context 132 does not determine that the node 102 is in an agreement with other nodes 104-110 in the blockchain system 100 with respect to the one or more characteristics of the index 136, the chain context 132 may, at step 414, return an error message to the execution layer 134. In some embodiments, the execution layer 134 may update the index 136, e.g., utilizing the consensus protocol implemented in the blockchain system 100, in response to receiving the error message from the chain context 132.

It is to be understood that while the chain context 132 is depicted as having performed the steps 408-414 in the description above, such a depiction is merely an example and is not meant to be limiting. It is contemplated that the execution layer 134 may be implemented to carry out some of the steps 408-414 depicted above, including, for example, utilizing obtained keys to retrieve their corresponding values and determining whether the node 102 is in an agreement with other nodes 104-110 in the blockchain system 100. It is also contemplated that certain steps, e.g., the step 408, may be invoked independently by the execution layer 134 to perform traversal operation during the execution of the smart contract 144 or other smart contracts.

Figure 5:
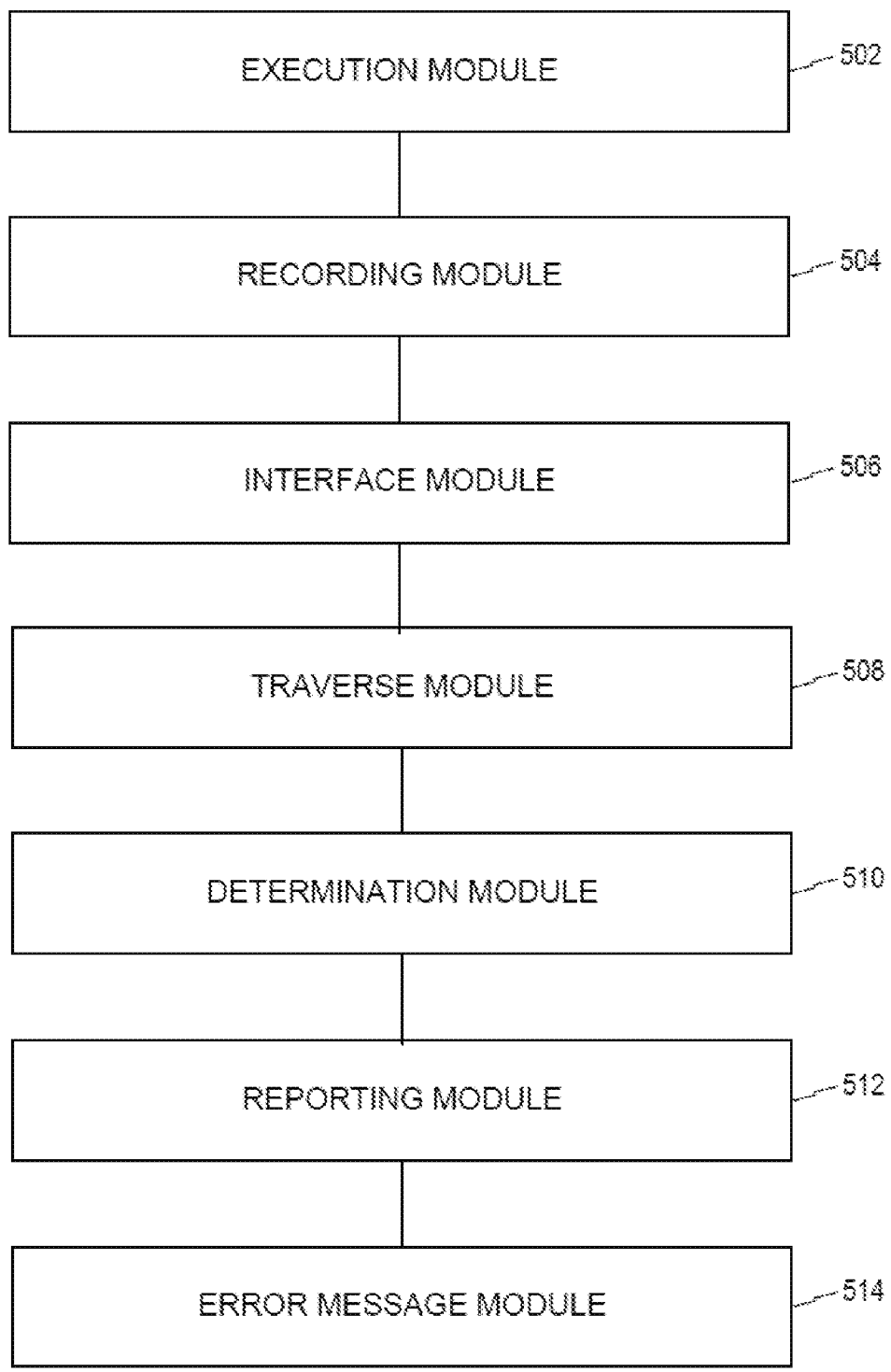
FIG. 5 is a block diagram of an apparatus for data traversal, according to an embodiment.

FIG. 5 is a block diagram of an apparatus 500 for data traversal, according to an embodiment. For example, the apparatus 500 may be an implementation of a software process, and may correspond to the method 400 (FIG. 4). Referring to FIG. 5, the apparatus 500 may include an execution module 502, a recording module 504, an interface module 506, a traverse module 508, a determination module 510, a returning module 512, and an error message module 514.

The execution module 502 may load a program, e.g., the smart contract 144 (FIG. 3), into a runtime environment, e.g., the execution layer 134 (FIG. 3). The execution layer 134 may parse the smart contract 144 to obtain one or more key-value pairs from the smart contract 144.

The recording module 504 may record the key-value pairs from the smart contract 144 on the blockchain 120 (FIG. 3) and update an index based on the key-value pairs.

The interface module 506 may provide an interface for the execution layer 134 to invoke a traversal function to traverse the key-value pairs. In some embodiments, the interface module 506 support invocation of the traversal function through an API.

The traverse module 508 may carry out the traverse function and obtain from the index a list of original keys as requested.

The determination module 510 may determine whether a plurality of nodes, e.g., all nodes, in a blockchain system are in an agreement with respect to one or more characteristics of the index utilized to carry out the traverse function. If all nodes in the blockchain system are in an agreement with respect to the one or more characteristics of the index, the returning module 512 may return the result of the traversal function and complete the traversal operation. If not all nodes in the blockchain system are in an agreement with respect to the one or more characteristics of the index, the error message module 514 may report an error message.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 500 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 500, references can be made to corresponding steps in the above-described methods. Details are omitted here for simplicity.

In some embodiments, a computer program product may include a non-transitory computer-readable storage medium having computer-readable program ions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instricton-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for data traversal, the method comprising:
   parsing a smart contract provided for execution on a blockchain to obtain one or more key-value pairs specified in the smart contract; and
   facilitating traversal of the one or more key-value pairs obtained from the smart contract, wherein the facilitating comprises:
   indexing one or more original keys specified in the one or more key-value pairs obtained from the smart contract to generate an index, the index associating the one or more original keys specified in the one or more key-value pairs obtained from the smart contract with an identifier of the smart contract to enable retrieval of the one or more original keys specified in the one or more key-value pairs obtained from the smart contract using the identifier of the smart contract;
   recording one or more characteristics of the index on the blockchain, the one or more characteristics of the index comprise a hash value of the index; and
   retrieving at least one value specified in the one or more key-value pairs based on the index.

2. The method of claim 1, further comprising:
   recording the index locally on a computer implementing the method.

3. The method of claim 1, wherein the identifier of the smart contract comprises an address assigned to the smart contract when the smart contract is incorporated into the blockchain.

4. The method of claim 1, wherein the one or more characteristics of the index comprise a number of data records recorded in the index.

5. The method of claim 1, further comprising:
   determining whether a plurality of nodes maintaining the blockchain are in an agreement with respect to the one or more characteristics of the index.

6. The method of claim 5, further comprising:
   in response to a determination that the plurality of nodes are not in an agreement with respect to the one or more characteristics of the index, updating the index.

7. The method of claim 1, wherein the index associates an original key specified in each of the one or more key-value pairs with the identifier of the smart contract.

8. The method of claim 7, further comprising:
   receiving a traversal request, the traversal request including information corresponding to the identifier of the smart contract; and
   retrieving, from the index, a key list containing the one or more original keys specified in the one or more key-value pairs based on the traversal request.

9. The method of claim 8, further comprising:
   retrieving a value corresponding to each key contained in the key list.

10. The method of claim 1, wherein the one or more key-value pairs include a group of key-value pairs as corresponding to a map, and the index associates an original key specified in each key-value pair in the group of key-value pairs with the identifier of the smart contract and an identifier of the map.

11. The method of claim 10, further comprising:
    receiving a traversal request, the traversal request including information corresponding to the identifier of the smart contract and the identifier of the map; and
    retrieving, from the index, a key list containing the original key specified in each key-value pair in the group of key value pairs based on the traversal request.

12. A device for data traversal, comprising:
    one or more processors; and
    one or more computer-readable memories coupled to the one or more processors and having instructions stored thereon that are executable by the one or more processors, wherein the one or more processors are configured to:
    parse a smart contract provided for execution on a blockchain to obtain one or more key-value pairs specified in the smart contract; and facilitate traversal of the one or more key-value pairs obtained from the smart contract, wherein in facilitating the traversal, the one or more processors are further configured to:
- index one or more original keys specified in the one or more key-value pairs obtained from the smart contract to generate an index, the index associating the one or more original keys specified in the one or more key-value pairs obtained from the smart contract with an identifier of the smart contract to enable retrieval of the one or more original keys specified in the one or more key-value pairs obtained from the smart contract using the identifier of the smart contract;
- record one or more characteristics of the index on the blockchain, the one or more characteristics of the index comprise a hash value of the index; and
- retrieve at least one value specified in the one or more key-value pairs based on the index.

13. The device of claim 12, wherein the one or more processors are further configured to:
record the index locally on the device.

14. The device of claim 12, wherein the identifier of the smart contract comprises an address assigned to the smart contract when the smart contract is incorporated into the blockchain.

15. A non-transitory computer-readable medium having stored therein instructions that, when executed by a processor of a device, cause the device to perform a method for data traversal, the method comprising:
- parsing a smart contract provided for execution on a blockchain to obtain one or more key-value pairs specified in the smart contract; and
- facilitating traversal of the one or more key-value pairs obtained from the smart contract, wherein the facilitating comprises:
  - indexing one or more original keys specified in the one or more key-value pairs obtained from the smart contract to generate an index, the index associating the one or more original keys specified in the one or more key-value pairs obtained from the smart contract with an identifier of the smart contract to enable retrieval of the one or more original keys specified in the one or more key-value pairs obtained from the smart contract using the identifier of the smart contract;
  - recording one or more characteristics of the index on the blockchain, the one or more characteristics of the index comprise a hash value of the index; and
  - retrieving at least one value specified in the one or more key-value pairs based on the index.

* * * * *